United States Patent [19]
Toader

[11] Patent Number: 5,806,043
[45] Date of Patent: Sep. 8, 1998

[54] METHOD FOR PROVIDING CUSTOMER ON-LINE SUPPORT VIA PREPAID INTERNET ACCESS

[75] Inventor: Adrian Toader, Overland Park, Kans.

[73] Assignee: Interactive Media Works, L.L.C., Overland Park, Kans.

[21] Appl. No.: 554,271

[22] Filed: Nov. 6, 1995

Related U.S. Application Data

[63] Continuation-in-part of Ser. No. 471,337, Jun. 6, 1995.

[51] Int. Cl.$^6$ .................................................. G06F 17/00
[52] U.S. Cl. ............................................................ 705/14
[58] Field of Search .............................. 395/336; 705/14

[56] References Cited

PUBLICATIONS

George Lawton, Self–Service at the Support Cafe, Software Magazine, pp. 49–53, Oct. 1995.
Stuart J. Johnston, Vendors Line Up On–line Support, Computerworld, p. 29, Nov. 14, 1994.
Ken Yamaha, Developers Eye Online Registration Options, Computer Reseller News, p. 2, Jun. 5, 1995.
Scott J. Brinker, Corporate Bulletin Board Systems: Customer Support and More in the 1990s, Feature, pp. 33–36, Nov. 1991.
Debra Aho Williamson, Interactive Media & Makketing: There's no Place Like Home, pp. 22 & 26. May 22, 1995.

*Primary Examiner*—Gail O. Hayes
*Assistant Examiner*—Phillip Groutt
*Attorney, Agent, or Firm*—Litman, McMahon, & Brown, L.L.C.

[57] ABSTRACT

A method for a sponsor/vendor to provide customer on-line help support for consumer products such as software includes providing a prepaid Internet access account which is supplied with the consumer product. Upon accessing the Internet the customer is "hot-linked" to the domain of the sponsor/vendor where help queries can be input and help answers received, either in real time or in a time delayed fashion via E-mail. The sponsor/vendor can mandate a tour of the domain for marketing purposes prior to allowing access to on-line help services. Finally, registration of the customer is promoted since registration can be made an integral part of the log on procedure.

19 Claims, 2 Drawing Sheets

METHOD FOR PROVIDING CUSTOMER ON-LINE SUPPORT VIA PREPAID INTERNET ACCESS

CROSS REFERENCE TO RELATED APPLICATIONS

This application is a continuation-in-part of application Ser. No. 08/471,337 for METHOD FOR PROVIDING SPONSOR PAID INTERNET ACCESS AND SIMULTANEOUS SPONSOR PROMOTION, filed Jun. 6, 1995.

BACKGROUND OF THE INVENTION

I. Field of The Invention

The present invention relates to a method for providing customer on-line support for consumer products such as software or the like via a prepaid Internet access account which is supplied with the consumer product. More particularly, the method includes the provision of a predetermined amount of prepaid Internet Access time to an Internet Entry Server which hot-links the customer to the sponsor/vendor's domain and "Home Page" with each purchase of the product. The customer can then access the sponsor/vendor's Home page to get on-line help, either in real time or time delayed via Electronic mail, for questions regarding the product.

II. Description of The Related Art

In marketing of many consumer products, including software products, it is customary to provide the customer with a limited amount of free access to on-line help regarding the product. Typically this help is provided via a toll free "800" telephone number or it can be accessed via a customer paid telephone number, i.e. the help is free but the customer pays for the telephone time. It is very expensive for a software developer and vendor to maintain adequate staffing of persons skilled enough technically to provide reliable software support, particularly to provide real time support during peak inquiry times. Furthermore, toll free telephone accounts can be very expensive, particularly since access to them is typically open ended.

Recent advances in personal computer technology and the ever increasing percentage of the population with access to a personal computer have made the Internet a viable alternative to telephone calls as a tool for providing consumer product support. Many on-line computer services, such as Prodigy and America On-Line, provide, for a fee as a part of their on-line service, software for connecting to and accessing the Internet. There are literally thousands of companies and organizations which maintain Internet/World Wide Web sites or "domains" which are accessible by users of the Internet. A problem with using the Internet and sponsor/vendor Web Sites or domains and associated "Home Pages" as an on-line help tool, is that customers who are unfamiliar with the Internet would have a difficult time locating and accessing the Home Page of the sponsor/vendor through traditional Internet access techniques such as those provided by on-line services. Furthermore, a large percentage of customers, even of software products, do not subscribe to an on-line service and/or do not have access to the Internet.

It is apparent that a new accessing strategy and method is needed for a sponsor/vendor of a consumer product to take advantage of the Internet to provide reliable on-line help to customers. Such a method should eliminate the need for the sponsor/vendor to maintain toll free telephone lines for help services and should allow help to be dispensed in real time or in a time delay fashion by electronic mail when staff are not available for real time help. Finally, such a method should provide the potential for "registration" of the customer and for simultaneous effective marketing of additional products of the sponsor/vendor in conjunction with the on-line help over the Internet.

SUMMARY OF THE INVENTION

The present invention is a method for providing on-line help services to customers of a sponsor/vendor's consumer products by providing a customer with vendor-paid access to the Internet for a limited time. The method includes the step of distributing to customers, along with the products, a floppy disc with Internet access software thereon. Associated with the floppy disc is a unique personal identification number (PIN) along with instructions on installing and using the Internet access software on a personal computer (PC). The Internet access software accesses and "handshakes" with an "Internet Entry Server", which verifies the PIN number, provides the access and times the user's access time. The Internet Entry Server is programmed to recognize the PIN number as entitling the user to a limited prepaid or "free" Internet access time for on-line help services. Such a time period could be for a total time period such as 1 hour or more, or access to on-line help services can be unlimited for 90 days, 6 months, etc., for example, with the access time paid for by the sponsor/vendor. The first time a customer uses the on-line help service, the Internet Entry Server performs a registration process which includes a number of personal questions and custom data gathering in the form of queries provided by the sponsor/vendor for response by the user. The pertinent answers are then immediately provided to the sponsor/vendor. The Internet Entry Server then "hot-links" the customer to the sponsor/vendor's Internet domain or Home Page for a mandatory "guided tour" where the user is exposed to any current product promotion by the sponsor/vendor and can download promotional coupons, product information, etc. After this mandatory guided tour is completed, the customer is allowed to enter queries for help in installing or using the sponsor/vendor's product. As an optional promotional service, upon termination of the on-line help session, access to other information on the Internet can be provided. Once the "free" on-line help service time or time period is up, the Internet Entry Server prompts the user with one or more of a plurality of options for extending the availability of on-line help. For example, the user can be prompted to enter a credit card number to which on-line help charges can be charged; he or she can be given the opportunity to answer additional survey information in return for additional "free" on-line help; or a 900 subscriber paid telephone access number can be provided through which additional on-line help will be billed via the normal telephone company 900 billing cycles.

OBJECTS AND ADVANTAGES OF THE INVENTION

The principle objects and advantages of the invention include: to provide an improved method of providing on-line help for customers of a sponsor/vendor's consumer products by providing "free" Internet access time to a the customer; to provide such an improved method in which the customer is given Internet access software for a PC which interfaces the PC with an Internet Entry Server to provide access to the Internet; to provide such a method in which a unique PIN number is associated with the access software, which PIN number entitles the customer to the free Internet access time and on-line help; to provide such a method in which the Internet Entry Server prompts the customer, upon initial dial-up, to register the software by answering a series of queries provided by the sponsor/vendor; to provide such a method in which the customer, once the registration is complete, is given a mandatory promotional "guided tour" of the sponsor/vendor's home page and domain prior to being given access to on-line help queries and personnel; to provide such a method in which any browsing done by the customer is also monitored and reported back to the sponsor/vendor for additional marketing information; to provide such a method in which, when the initial allotted free on-line help time is used up, the customer is given one or more options to acquire additional Internet on-line help time; and to provide such a method which achieves effective marketing of a sponsor/vendor's software products while providing on-line help to the customers at minimal expense.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
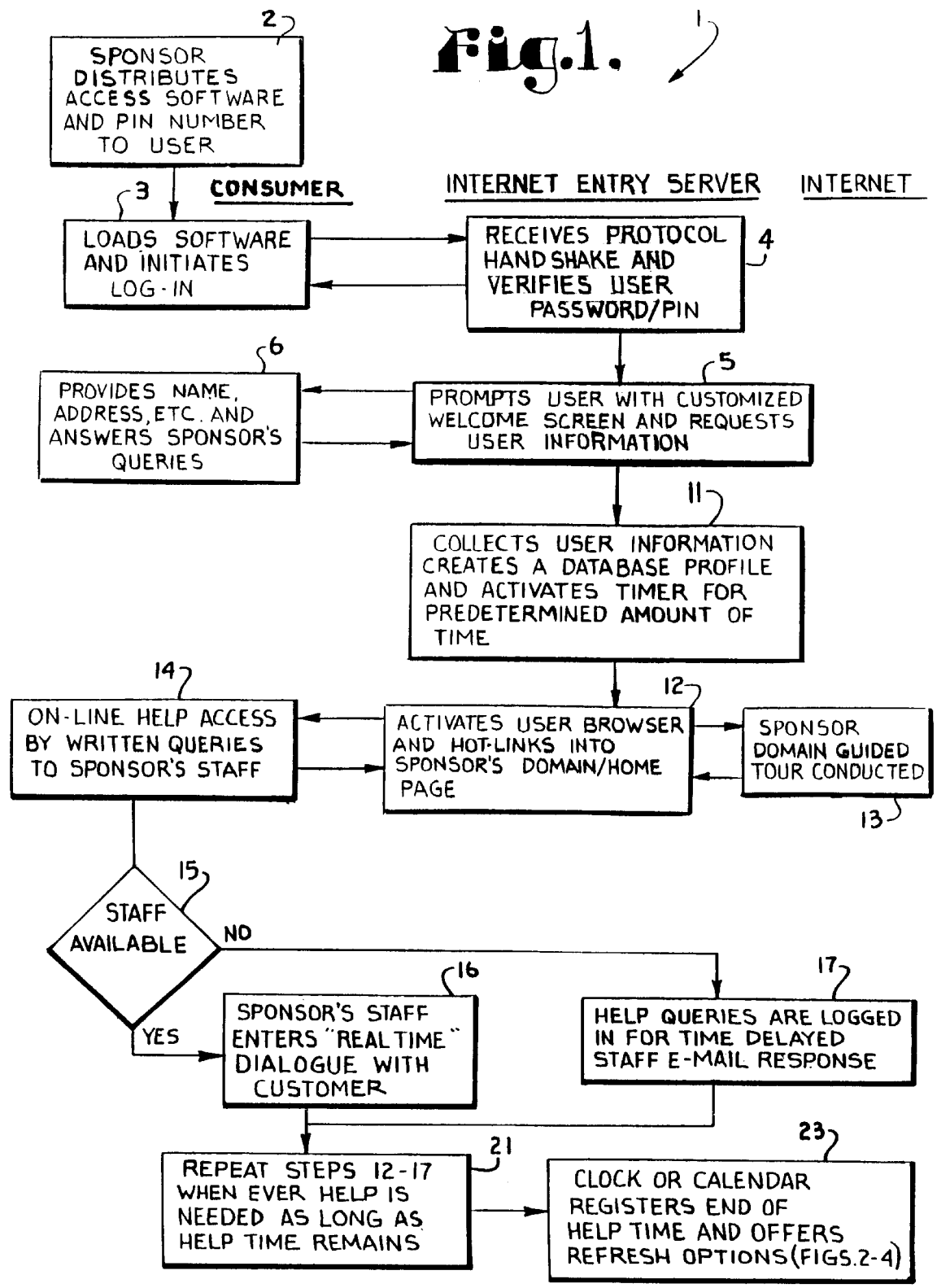
FIG. 1 is a schematic block diagram of a method of providing sponsor/vendor paid Internet access time for on-line help services while simultaneously promoting registration of the software and marketing the sponsor/vendor's other products and/or services.

Referring to FIG. 1, the numeral 1 generally refers to a method of providing a customer of software products with a sponsor/vendor-paid Internet access time allotment for on-line service help with the software while promoting registration of the customer and simultaneously providing an effective marketing tool for marketing other software products to the customer.

At block 2, the customer purchases a software product and, along with the product the software vendor or sponsor provides the customer with Internet access software and a PIN number which authorizes the customer to access the Internet for an allotted time period in order to access on-line help services for the software. At block 3, the customer loads the Internet access software and initiates log-in. Log-in can be a requirement during the set-up phase of the purchased software, for example, such that registration is automatically accomplished. For example, during set-up the software can cause the customer's PC to automatically dial a toll free number to access the sponsor's domain and registration can be accomplished as described below for all customers. Alternatively, log-in can be accomplished selectively by the customer only when he or she has a problem or question for the sponsor/vendor about the product. It should be noted here that, although the product is described herein as software, any other suitable consumer product for which on-line help is provided can be substituted. For example, manufacturers of home appliances, automobiles, or other products with relatively complex control systems can provide customers with on-line help over the Internet by using the method disclosed and described herein. If the product is software, the Internet access software can be an integral part of the purchased software package. In that situation, step 3 would be accomplished simply by loading and initializing the purchased software.

At block 4, the IES receives the protocol handshake automatically entered by the PC and verifies the customer's PIN number. At block 5, the IES prompts the customer with a customized "welcome" screen which preferably features the sponsor/vendor's logo and other sponsor/vendor supplied information. At this point, the customer is requested to register by supplying answers to queries, including typical questions such as name, address, age, gender; etc. as well as sponsor/vendor supplied specialized survey queries. For purposes of receiving "time-shifted" help, as explained below, the customer can be requested to enter an Electronic mail address during registration as well. At block 6, the customer provides answers to the questions, wherein, at block 11, the IES collects the information and compiles a database profile for this customer, forwards the profile to the sponsor, and activates a timer or starts a calendar to time the customer's Internet on-line help access.

At block 12, the IES activates an Internet navigational software "browser" program on the customer's PC. Such browser programs are widely available, and include titles such as Netscape, Mosaic, etc. The IES directs the browser program to directly connect (hot-link) the customer to the Internet domain/Home Page of the sponsor, signified by block 13. At block 13, the customer is conducted through a mandatory "guided tour" of the sponsors domain where he or she is exposed to any product promotional information, coupon retrieval options, etc., which the sponsor wants to feature. After the sponsor domain guided tour, at block 14, the customer now has access to the on-line help features provided by the sponsor. The customer can type in questions and receive answers in one of two ways. At block 15, the questions are entered when help staff is available for real time answers, i.e. as a question is entered, someone on the sponsor's staff has a "live" discussion with the customer and provides immediate answers to the questions. Block 16 illustrates an alternative in which the sponsor provides "time shifted" responses. For example, when all staff are busy or during off hours, queries can be logged in and answered later via Electronic mail. The customer's Electronic mail address can be provided as a feature of the log-on or registration procedure, as described above. At block 21, the customer can repeat the access to the sponsor's domain for additional help inquiries at any time during which he is still entitled to on-line help. For example, each customer can be given a total of 2 hours of help time which can be used at any time, or he or she can be given unlimited access to on-line help during the first 90 days after purchase and registration. At block 23, the IES clock or calendar times out the initial period and brings up a predefined informational screen to the customer, again preferably featuring the sponsor's logo and identifying information. On this informational screen, one or more alternatives (FIGS. 2–4) are provided to the customer to extend or "refresh" the time during which access to on-line help is available via the Internet.

Figure 2:
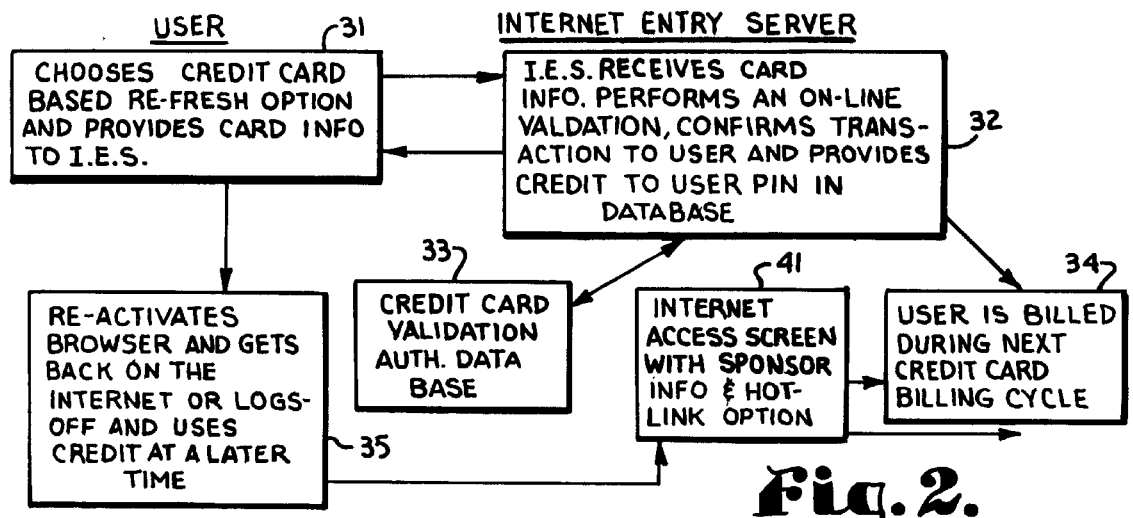
FIG. 2 is a schematic block diagram of a first option for extending a customer's access to on-line help via the Internet past the initial sponsor/vendor paid access time allotment.

Referring to FIG. 2, a block diagram of a first option for refreshing the Internet time allotment is illustrated. In this option, the customer can give a credit card number to which additional Internet access time will be billed via the normal IES billing procedure. At block 31, the customer chooses the credit card option from a menu of refresh options and provides his or her credit card information as well as a time purchase to the IES. At block 32, the IES receives the credit card information, performs an on-line validation from a credit card validation database (block 33), provides confirmation to the customer and credits the customer's PIN account with the additional time. At block 34, the customer is billed during the normal credit card billing cycle. At block 35, the customer reactivates the browser program and continues the Internet access or logs off and reserves the purchased time for later use. At block 41, each time the customer reactivates the Internet browser program, a screen is presented which features the sponsor's logo or other identifying data and an option to hot-link to the sponsor's domain, possibly for no charge during the sponsor domain access.

Figure 3:
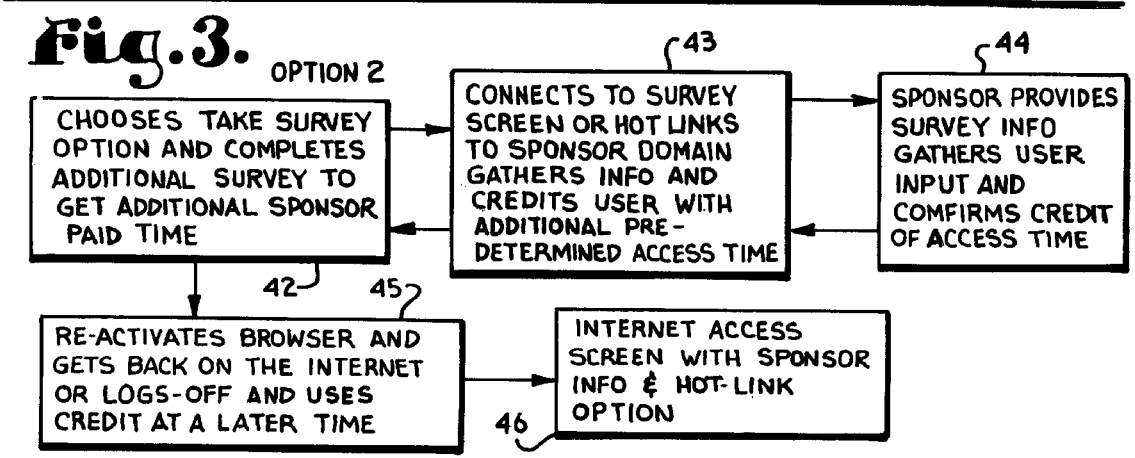
FIG. 3 is a schematic block diagram of a second option for extending a customer's access to on-line help via the Internet past the sponsor/vendor paid access time allotment.

FIG. 3 illustrates a block schematic diagram of a second option for refreshing the customer's Internet time allotment. In this option, the customer can take an additional "survey", answering additional questions and/or providing further information solicited by the sponsor, and, in return, receives an additional sponsor paid Internet time allotment. At block 42, the customer chooses the Survey refresh option and, at block 43, the IES connects the customer to a survey screen or, at block 44, hot-links the customer to the sponsor domain where the customer interactively provides the required information. Once the additional survey is complete, the sponsor, again at block 44, authorizes the additional Internet connect time allotment to the customer. At block 45, the customer reactivates the browser program and re-accesses the Internet or logs off and reserves the additional time for later use. At block 46, as in block 41 in FIG. 2, each time the customer logs on, a sponsor tailored information screen is displayed with sponsor hot-link options.

Figure 4:
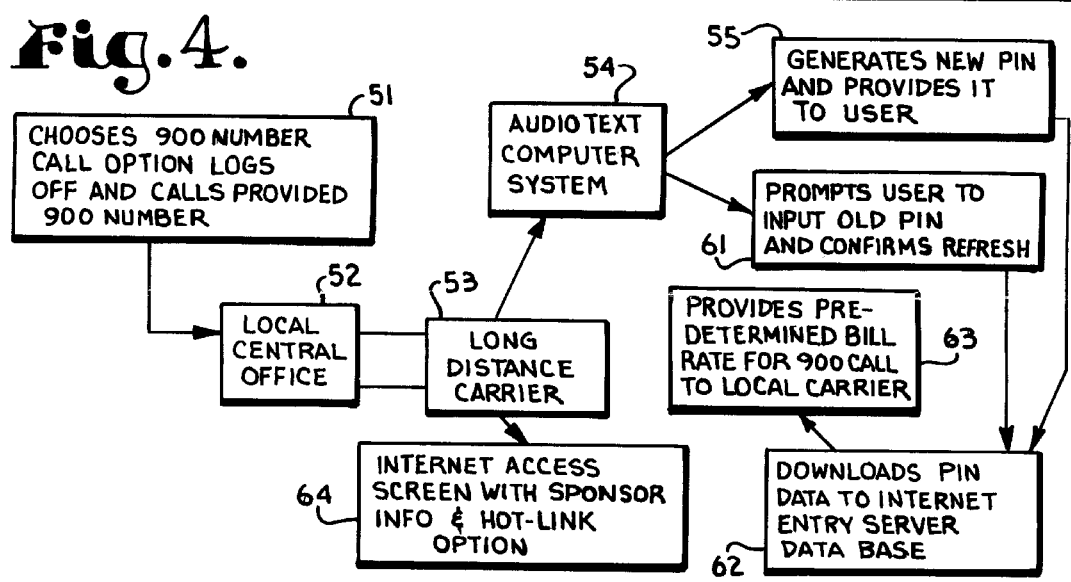
FIG. 4 is a schematic block diagram of a third option for extending a customer's access to on-line help via the Internet past the sponsor/vendor paid access time allotment.

FIG. 4 illustrates a block schematic diagram of a third option for refreshing the customer's Internet time allotment. In this option, the customer can access the IES via a "900" subscriber pay number where Internet access time will be billed through the customer's telephone company 900 billing procedures. At block 51, the 900 number option is selected, whereupon the customer logs off and, either immediately or at a future time, calls the assigned 900 number, using a touch-tone telephone. The 900 call proceeds through normal call channels including, at blocks 52 and 53,respectively, the customer's local central office and long distance carrier, terminating at an IES linked audiotext computer system at block 54. At block 55 the IES assigns a new PIN number, or, alternatively, at block 61, prompts the entry of the old, originally assigned PIN number. At block 62, the PIN information is used to open a new account. Finally, at block 63, billing is done via normal long distance carrier and/or telephone company 900 billing procedures at a billing rate provided by the IES. Subsequent to access time being credited to customer, he logs on via new or refreshed PIN. At block 64, Internet access screens are provided which preferably include the sponsor's logo or other information and a hot-link option to access the sponsor's domain with each log-on by the customer. Again, the time consumed by the customer in visiting the sponsor's domain can be provided free of charge.

The benefits of the inventive on-line help method to the customer are many. First, the customer can access, free of charge initially, a medium which is much more conducive to help than verbal telephone conversations. Written instructions or commands, composed with care, and answers which can be down-loaded and looked at later are much better for help interchanges than merely talking with help staff. With access software provided to access an Internet Entry Server directly, the customer does not need to be a subscriber to an on-line service. Instead, the inventive method is a direct substitute for the typical 800 telephone help service, but with on-line media capability.

The benefits to the sponsor/vendor are even greater. First, registration of the software product or other consumer product is encouraged or even required in the case of automatic registration during software installation. Registration by customers is a major challenge facing software vendors in particular. One variation would be to provide an additional incentive to registration by offering Internet "browsing" time in return for registration, much as described in refresh option 2 in FIG. 3 described above.

Second, the sponsor/vendor is given a more efficient way to provide help to its customers. In providing help services, verbal communication with customers over the telephone is just as cumbersome and frustrating to the help staff as it is to the customer, perhaps more so since many technical people are not skilled in dealing one on one verbally with members of the public. Furthermore, the sponsor/vendor can hire skilled technical help from remote areas since the help staff can operate via the Internet from anywhere instead of being located at the terminus of the sponsor's 800 telephone link.

Thirdly, the inventive method saves costs for the sponsor/vendor over 800 call in numbers which are difficult to police and regulate, particularly without reliable registration lists or other ways to confirm legitimate customers. The use of PIN numbers and associated limited time help authorizations limits the cost exposure of sponsor/vendors in providing help. Furthermore, the convenient ways in which the customer can refresh his help authorization can provide enhanced revenue possibilities for the sponsor/vendor.

Finally, the inventive method provides an effective marketing tool in that the customers of the sponsor/vendor's other products are exposed to marketing materials while accessing the Internet domain of the sponsor/vendor. Of course, these customers of software products are typically the best target audience for marketing of additional software products.

It is to be understood that while certain forms of the present invention have been illustrated and described herein, it is not to be limited to the specific forms or arrangement of parts described and shown.

What is claimed and desired to be secured by Letters Patent is as follows:

1. A method of providing a sponsor paid Internet connect time allotment to a customer of the sponsor's products for on-line help relating to those products, said method comprising the steps of:

a. distributing sponsor provided Internet access software to the user along with the product;

b. providing a PIN number to the customer which PIN number entitles the customer to log on to an Internet Entry Server via said Internet access software;

c. hot-linking the customer directly into an Internet domain of the sponsor upon log on to the Internet Entry Server by the customer via said Internet access software;

d. allowing the customer to access help on-line in the Internet domain of the sponsor by inputting help queries and receiving help answers, or, alternatively, e. allowing the customer to choose to utilize the sponsor paid Internet connect time allotment to access other Internet sites via the Internet Entry Server and said Internet access software.

2. A method as in claim 1, wherein said access to said on-line help is available to said customer for a limited time period, said method further comprising the step of:

a. providing said customer with one or more options to extend the time for which said on-line help is available after said limited time period has expired.

3. A method as in claim 2, and further wherein said options to extend include one or more of the following:

a. providing a credit card number to which further Internet access time can be charged;

b. answering further survey questions in return for an extension of the sponsor paid Internet access time; and c. a 900 call service whereby said customer accesses said Internet Entry Server after calling a subscriber paid 900 telephone number for further Internet access time.

4. A method as in claim 1, and further comprising the step of:

a. prompting the customer to answer a series of queries upon log on to the Internet Entry Server to register the product.

5. A method as in claim 1, wherein said product is a software product, said method further comprising the step of:

a. prompting the customer to answer a series of queries upon initial installation of said software product and forwarding the answers to said sponsor via said Internet Entry Server to register the product.

6. A method as in claim 1, and further comprising the step of:

a. conducting said customer through a guided tour of the sponsor's Internet domain prior to allowing access to on-line help.

7. A method as in claim 1, and further including the step of:

a. displaying an initial display screen each time the customer accesses the Internet via said Internet Entry Server which display screen includes sponsor related displays or other sponsor related information.

8. A method as in claim 1, wherein said on-line help answers can selectively be provided in a time delay fashion via electronic mail.

9. A method of providing a sponsor paid Internet connect time allotment to a customer of the sponsor's products for on-line help relating to those products, said method comprising the steps of:

a. distributing sponsor provided Internet access software to the user along with the product;

b. providing a PIN number to the customer which PIN number entitles the customer to log on to an Internet Entry Server via said Internet access software;

c. hot-linking the customer directly into an Internet domain of the sponsor upon log on to the Internet Entry Server by the customer;

d. conducting said customer through a guided tour of the sponsor's Internet domain; and e. allowing the customer to access help on-line in the Internet domain of the sponsor by inputting help queries and receiving help answers, or, alternatively, f. allowing the customer to choose to utilize the sponsor paid Internet connect time allotment to access other Internet sites via the Internet Entry Server and said Internet access software.

10. A method as in claim 9, wherein said access to said on-line help is available to said customer for a limited time period, said method further comprising the step of:

a. providing said customer with one or more options to extend the time for which said on-line help is available after said limited time period has expired.

11. A method as in claim 10, and further wherein said options to extend include one or more of the following:

a. providing a credit card number to which further Internet access time can be charged;

b. answering further survey questions in return for an extension of the sponsor paid Internet access time; and c. a 900 call service whereby said customer accesses said Internet Entry Server after calling a subscriber paid 900 telephone number for further Internet access time.

12. A method as in claim 9, and further comprising the step of:

a. prompting the customer to answer a series of queries upon log on to the Internet Entry Server to register the product.

13. A method as in claim 9, wherein said product is a software product, said method further comprising the step of:

a. prompting the customer to answer a series of queries upon initial installation of said software product and forwarding the answers to said sponsor via said Internet Entry Server to register the product.

14. A method as in claim 9, and further including the step of:

a. displaying an initial display screen each time the customer accesses the Internet via said Internet Entry Server which display screen includes sponsor related displays or other sponsor related information.

15. A method as in claim 9, wherein said on-line help answers can selectively be provided in a time delay fashion via electronic mail.

16. A method of providing a sponsor paid Internet connect time allotment to a customer of the sponsor's software products for on-line help relating to those products, said method comprising the steps of:

a. distributing sponsor provided Internet access software to the user along with the software product;

b. providing a PIN number to the customer which PIN number entitles the customer to log on to an Internet Entry Server via said sponsor Provided Internet access software;

c. hot-linking the customer directly into an Internet domain of the sponsor upon log on to the Internet Entry Server by the customer;

d. prompting the customer to answer a series of queries to register the product;

e. conducting said customer through a guided tour of the sponsor's Internet domain; and f. allowing the customer to access help on-line in the Internet domain of the sponsor by inputting help queries and receiving help answers, or, alternatively, g. allowing the customer to choose to utilize the sponsor paid Internet connect time allotment to access other Internet sites via the Internet Entry Server and said Internet access software.

17. A method as in claim 16, wherein said access to said on-line help is available to said customer for a limited time period, said method further comprising the step of:

a. providing said customer with one or more options to extend the time for which said on-line help is available after said limited time period has expired.

18. A method as in claim 17, and further wherein said options to extend include one or more of the following:

a. providing a credit card number to which further Internet access time can be charged;
  b. answering further survey questions in return for an extension of the sponsor paid Internet access time; and
  c. a 900 call service whereby said customer accesses said Internet Entry Server after calling a subscriber paid 900 telephone number for further Internet access time.

19. A method as in claim 16, wherein said on-line help answers can selectively be provided in a time delay fashion via electronic mail.

* * * * *